April 16, 1929.  J. B. HAWLEY, JR  1,709,474
WELDING ROD
Filed April 11, 1928

Inventor
JOHN B. HAWLEY Jr

Patented Apr. 16, 1929.

1,709,474

UNITED STATES PATENT OFFICE.

JOHN B. HAWLEY, JR., OF MINNEAPOLIS, MINNESOTA.

WELDING ROD.

Application filed April 11, 1928. Serial No. 269,286.

The invention has to do with the art of welding where additional metal is added to the metal to be welded.

The preferred embodiment of the invention is simply a solid core rod of suitable welding material over which is deposited a suitable flux and then over the flux is drawn or shrunk a cover in the form of a metallic tube. It may be however that this process of forming the rod will be carried still further and additional flux coatings and additiontal tubes or metal coverings be added to the first described. In this manner it is possible to form a welding rod of as many different metals and as many different fluxes as may be desired.

The advantage of my construction lies in the fact that the outside metallic coating prevents the loss of flux by evaporation at high temperatures. Further advantage lies in the application of flux evenly at the point of welding so that less flux is required and the work is not unnecessarily covered with flux. Other advantage lies in the ability to use metals that would segregate into uneven proportions if melted into a solid rod; in other words it is possible to use metal that will not evenly mix in large heats by applying them directly in the manner I describe. Still more saving comes in the speed possible for welding when the flux is applied in proper proportion and the flux is protected from flame contact until it is needed at the immediate point of application.

It is conceivable that the flux coating would be thick to a degree that the heating of the rod by conduction along the metal or absorption of radiant energy would cause flux to flow from the space between the core and the covering tube and run down into the weld. To prevent this the tube may be beaded.

In the drawings:

The Fig. 1 shows a length of plain covered welding rod with section of covering cut back to demonstrate the positions of core rod, flux, and covering tube.

Figure 1:
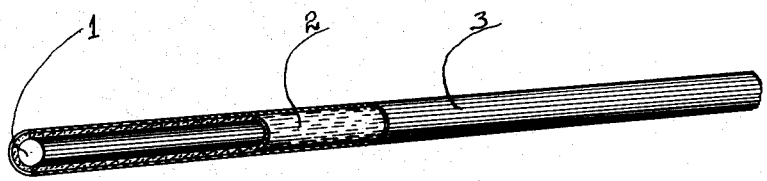
Figure 2:
Fig. 2 shows the same as Fig. 1 except in cross section.

The solid metallic rod 1 is covered on its outer surface with flux coating 2. The tube 3 is then drawn over the outside of rod 1 and flux coating 2. This drawing may be by swaging or rolling or the tube 3 may even be rolled from a sheet of metal and not be entirely closed over the outside of flux 2. It is also possible that covering 3 be spirally wound over rod 1 and flux 2.

Figure 3:
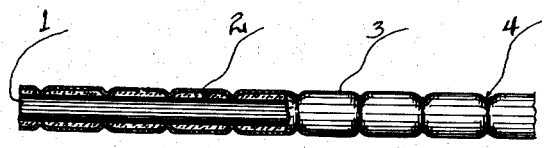
Fig. 3 shows the same rod as Fig. 1 and Fig. 2 except beads of annular design are rolled into the outer tube to prevent flux running at high temperatures.

In Fig. 3 it will be noted that annular rings are formed in the tube 3 and are noted as typical by annular groove 4. It is possible that these grooves will be formed as spirals which would be about the same in effecting slow flow of flux as are the grooves 4 as shown.

It is possible that rod 1 and flux 2 and covering 3 will all be of different materials to suit special conditions. For instance one application would be for welding copper to steel; in this case the center rod would be solid electrolytic copper, the flux borax glass, and the covering tube would be phosphor bronze composed of ninety nine percent copper and nine tenths of one percent tin and the remainder phosphorus and silver. Every condition would demand suitable combinations of the rod, the flux, and the covering tube.

Having thus described the invention what is claimed is;

1. A welding rod comprising a solid core, flux covering the core, a metallic jacket covering the flux, said jacket having pockets formed by rolling annular grooves therein.

2. A welding rod comprising a solid core flux covering the core, a metallic tube covering the flux, said metallic tube being spirally grooved on its inner surface.

In testimony whereof, I affix my signature.

JOHN B. HAWLEY, JR.